US012246660B2

(12) United States Patent
Kobayashi

(10) Patent No.: US 12,246,660 B2
(45) Date of Patent: Mar. 11, 2025

(54) GROMMET

(71) Applicant: SUMITOMO WIRING SYSTEMS, LTD., Mie (JP)

(72) Inventor: Taiki Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 219 days.

(21) Appl. No.: 17/922,924

(22) PCT Filed: May 20, 2021

(86) PCT No.: PCT/JP2021/019243
§ 371 (c)(1),
(2) Date: Nov. 2, 2022

(87) PCT Pub. No.: WO2021/235529
PCT Pub. Date: Nov. 25, 2021

(65) Prior Publication Data
US 2023/0166677 A1     Jun. 1, 2023

(30) Foreign Application Priority Data

May 22, 2020  (JP) ................ 2020-090085

(51) Int. Cl.
*H02G 3/22*     (2006.01)
*B60R 16/02*    (2006.01)

(52) U.S. Cl.
CPC ........... *B60R 16/0222* (2013.01); *H02G 3/22* (2013.01)

(58) Field of Classification Search
CPC .. H02G 3/22; H02G 3/24; H02G 3/26; H02G 3/30; H02G 3/083; B60R 16/02; B60R 16/0222; F16L 5/02; H01B 17/58; H01B 17/583
See application file for complete search history.

(56) References Cited

U.S. PATENT DOCUMENTS

| | | | |
|---|---|---|---|
| 2013/0008693 A1 | 1/2013 | Okuhara et al. | |
| 2015/0144414 A1* | 5/2015 | Tanigaki | B60L 1/02 180/291 |
| 2016/0318464 A1 | 11/2016 | Oohira | |
| 2021/0033222 A1* | 2/2021 | Short | F16L 5/14 |

FOREIGN PATENT DOCUMENTS

JP      2011-188619 A      9/2011

OTHER PUBLICATIONS

International Search Report issued on Jul. 20, 2021 for WO 2021/235529 A1 (4 pages).

* cited by examiner

*Primary Examiner* — Roshn K Varghese
(74) *Attorney, Agent, or Firm* — Venjuris, P.C.

(57) ABSTRACT

The grommet also includes an annular opposing portion that opposes a portion of the vehicle body panel surrounding the insertion hole, and is sandwiched between the vehicle body panel and a bracket fixed to the vehicle body panel. Furthermore, the grommet includes a coupling portion that couples the insertion portion and the opposing portion so as to close a gap between the insertion portion and the opposing portion. The opposing portion includes an annular sealing portion to be in intimate contact with the vehicle body panel. The coupling portion includes a plurality of pleat portions that extend along a circumferential direction of the opposing portion, and are adjacently arranged in a radial direction of the opposing portion, when viewed from an axial direction of the opposing portion.

8 Claims, 6 Drawing Sheets

GROMMET

CROSS REFERENCE TO RELATED APPLICATIONS

This application is a national phase of PCT application No. PCT/JP2021/019243, filed on 20 May 2021, which claims priority from Japanese patent application No. 2020-090085, filed on 22 May 2020, all of which are incorporated herein by reference.

TECHNICAL FIELD

The present disclosure relates to a grommet.

BACKGROUND

There are cases where, when a wire harness is inserted into an insertion hole provided in a vehicle body panel, a grommet is used in order to stop water entering the insertion hole. Examples of such a grommet include a grommet to be mounted to a vehicle body panel using a bracket that is fixed to the vehicle body panel as described in Patent Document 1. Such a grommet includes a tubular insertion portion that covers the outer periphery of a wire harness, an annular opposing portion that opposes a portion of a vehicle body panel surrounding an insertion hole, and a coupling portion that couples the insertion portion and the opposing portion. The opposing portion includes a sealing portion that is in intimate contact with the vehicle body panel. As a result of the opposing portion being sandwiched between the bracket and the portion of the vehicle body panel surrounding the insertion hole, the grommet is mounted to the vehicle body panel, and the sealing portion is in intimate contact with the vehicle body panel, stopping water entering between the vehicle body panel and the grommet.

PRIOR ART DOCUMENT

Patent Document

Patent Document 1: JP 2016-210214 A

SUMMARY OF THE INVENTION

Problems to be Solved

Incidentally, there are cases where a wire harness is inserted into an insertion hole in a state of being inclined relative to the insertion hole. Also, there may be an error in disposition of a wire harness in a vehicle. In such cases, in the grommet, the insertion portion may be pulled relative to the opposing portion in the axial direction of the opposing portion, and the insertion portion may be inclined largely relative to the opposing portion. There is then the possibility that stress caused by a change in the orientation or position of the insertion portion cannot be sufficiently absorbed only by the coupling portion, and even the opposing portion will be deformed. If the opposing portion deforms, there is the possibility that a gap will be formed between the opposing portion and the vehicle body panel. If a gap is formed between the opposing portion and the vehicle body panel, there is the possibility that water will enter through the gap, and thus there is concern that the water stopping performance of the grommet will decrease.

An object of the present disclosure is to provide a grommet that can suppress a decrease in water stopping performance.

Means to Solve the Problem

A grommet according to the present disclosure includes: a tubular insertion portion that is to cover an outer periphery of a wire harness inserted into an insertion hole provided in a vehicle body panel, an annular opposing portion that is to oppose a portion of the vehicle body panel surrounding the insertion hole, and to be sandwiched between the vehicle body panel and a bracket fixed to the vehicle body panel, and a coupling portion that couples the insertion portion and the opposing portion so as to close a gap between the insertion portion and the opposing portion, the opposing portion including an annular sealing portion to be in intimate contact with the vehicle body panel, and the coupling portion including a plurality of pleat portions that extend along a circumferential direction of the opposing portion, and are adjacently arranged in a radial direction of the opposing portion, when viewed from an axial direction of the opposing portion.

Effect of the Invention

With a grommet according to the present disclosure, it is possible to suppress a decrease in water stopping performance.

DETAILED DESCRIPTION TO EXECUTE THE INVENTION

Description of Embodiments of Present Disclosure

Figure 1:
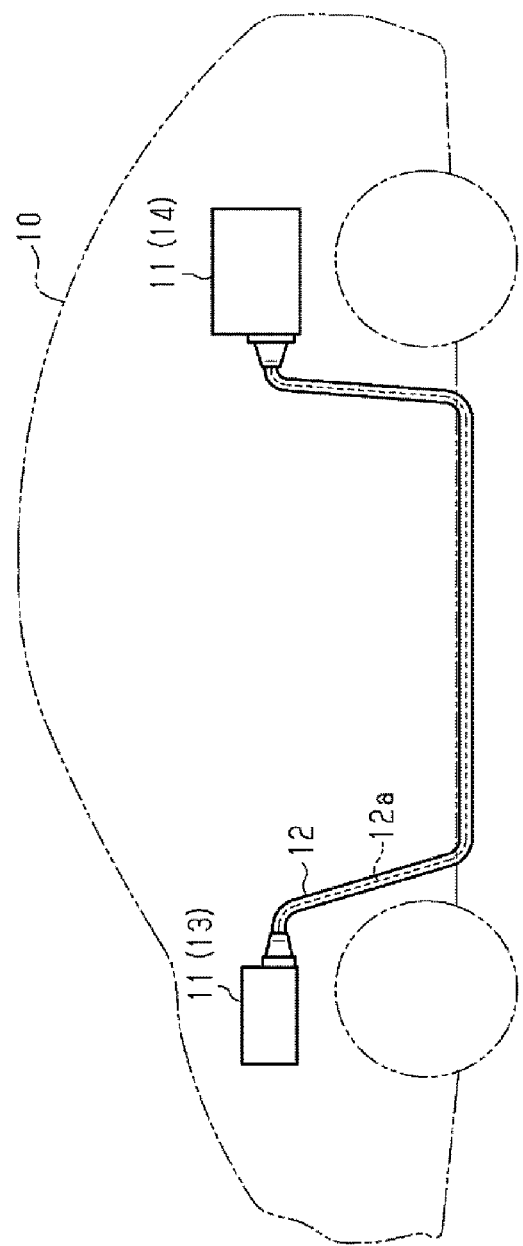
FIG. 1 is a schematic diagram showing a state where a wire harness according to an embodiment is routed in a vehicle.

First, embodiments of the present disclosure will be listed and described.

[1] A grommet according to the present disclosure is a grommet including: a tubular insertion portion that is to cover an outer periphery of a wire harness inserted into an insertion hole provided in a vehicle body panel, an annular opposing portion that is to oppose a portion of the vehicle body panel surrounding the insertion hole, and to be sandwiched between the vehicle body panel and a bracket fixed to the vehicle body panel, and a coupling portion that couples the insertion portion and the opposing portion so as to close a gap between the insertion portion and the opposing portion, the opposing portion including an annular sealing portion to be in intimate contact with the vehicle body panel, and the coupling portion including a plurality of pleat portions that extend along a circumferential direction of the opposing portion, and are adjacently arranged in a radial direction of the opposing portion, when viewed from an axial direction of the opposing portion.

With this configuration, as a result of the plurality of pleat portions deforming so as to open and close, stress caused by movement of the insertion portion relative to the opposing portion can be absorbed by the coupling portion that includes the plurality of pleat portions. Therefore, it is possible to suppress deformation of the opposing portion caused by movement of the insertion portion relative to the opposing portion, and thus it is possible to suppress deformation of the sealing portion. As a result, it is possible to suppress a decrease in water stopping performance of the grommet.

[2] Preferably, at least one of the plurality of pleat portions is formed in an annular shape that surrounds an outer periphery of the insertion portion when viewed from an axial direction of the insertion portion.

With this configuration, in whichever direction the insertion portion moves around the insertion portion itself relative to the opposing portion, stress caused by movement of the insertion portion relative to the opposing portion can be absorbed by the coupling portion that includes the pleat portions. Therefore, in whichever direction the insertion portion moves around the insertion portion itself relative to the opposing portion, it is possible to suppress deformation of the opposing portion, and thus it is possible to suppress deformation of the sealing portion. As a result, irrespective of a direction of movement of the insertion portion relative to the opposing portion, it is possible to suppress a decrease in water stopping performance of the grommet. In addition, larger movement of the insertion portion relative to the opposing portion can be allowed in the coupling portion, and thus it is possible to further suppress a decrease in water stopping performance of the grommet.

[3] Preferably, the coupling portion includes a bellows portion in which the plurality of pleat portions are connected continuously in a radial direction of the opposing portion.

With this configuration, the plurality of pleat portions that are adjacently arranged in the radial direction of the opposing portion constitute the bellows portion. Thus, in addition to the plurality of pleat portions deforming so as to open and close, each portion between pleat portions that are adjacent in the radial direction can deform so as to open and close. Therefore, stress caused by movement of the insertion portion relative to the opposing portion is easily absorbed by the coupling portion that includes the bellows portion. Thus, it is possible to further suppress deformation of the opposing portion caused by movement of the insertion portion relative to the opposing portion, and thus it is possible to further suppress deformation of the sealing portion. As a result, it is possible to further suppress a decrease in water stopping performance. In addition, even larger movement of the insertion portion relative to the opposing portion can be allowed by the coupling portion, and thus it is possible to further suppress a decrease in water stopping performance of the grommet.

[4] Preferably, the bellows portion is directly coupled to the insertion portion.

With this configuration, it is possible to suppress deformation of a portion of the grommet other than the bellows portion, when the insertion portion moves relative to the opposing portion.

[5] Preferably, the grommet includes the insertion portion into which the wire harness is to be inserted, the wire harness including an electric wire that is electrically connected to a power source for driving a motive power source for vehicle travel.

With this configuration, the electric wire that is connected to the power source for driving the motive power source for vehicle travel has a cross-sectional area that is large enough to carry a current supplied from the power source, and thus the wire harness that includes the electric wire is not easily bent. When such a wire harness is displaced relative to the vehicle body due to an attachment error or the like, it is difficult for such displacement to be absorbed on the wire harness side through deformation of the wire harness. Thus, the insertion portion into which the wire harness is inserted is moved relative to the opposing portion, and such displacement is thereby absorbed. In this manner, even if the insertion portion is moved relative to the opposing portion due to displacement of the wire harness, the plurality of pleat portions deform so as to open and close, and thereby stress caused by movement of the insertion portion relative to the opposing portion can be absorbed by the coupling portion that includes the plurality of pleat portions. Therefore, even when the wire harness that includes the electric wire that is connected to the power source for driving the motive power source for vehicle travel is inserted into the insertion portion, it is possible to suppress deformation of the opposing portion caused by movement of the insertion portion relative to the opposing portion, and thus it is possible to suppress deformation of the sealing portion. As a result, even when the wire harness that includes the electric wire that is connected to the power source for driving the motive power source for vehicle travel is inserted into the insertion portion, it is possible to suppress a decrease in water stopping performance of the grommet.

DETAILED EMBODIMENTS OF PRESENT DISCLOSURE

Specific examples of the grommet according to the present disclosure will be described below with reference to the drawings. Note that the present invention is not limited to these illustrative examples, but is indicated by the claims, and all changes that come within the meaning and range of equivalency of the claims are intended to be embraced therein.

The following describes an embodiment of the grommet. Note that, in the drawings, some of the components may be shown exaggerated or simplified for the sake of convenience of description. In addition, the dimensional ratios of the components may be different from those of actual components.

Figure 2:
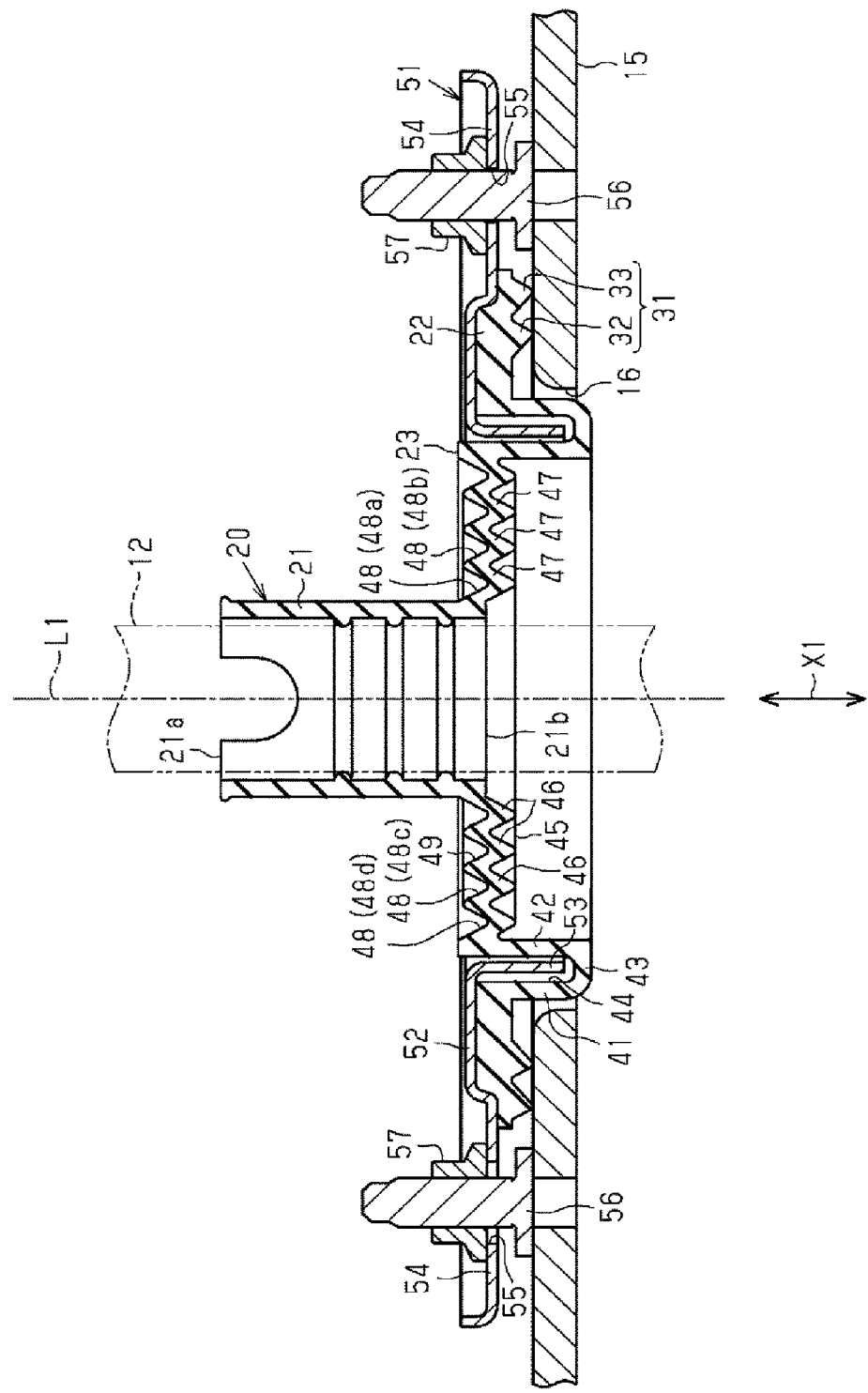
FIG. 2 is a cross-sectional view of a grommet mounted to a vehicle body panel according to an embodiment.

As shown in FIGS. 1 and 2, a wire harness 12 that electrically connects electric devices 11 mounted in a vehicle 10 such as a hybrid automobile or an electric automobile is inserted into a grommet 20 according to the present embodiment. FIG. 1 illustrates only two electric devices 11 out of a plurality of electric devices 11 that are mounted in the vehicle 10. The wire harness 12 is routed so as to be passed through a space under the floor of the vehicle 10 and extends in the front-rear direction of the vehicle 10, for example. The wire harness 12 includes at least one electric wire. The wire harness 12 according to the present embodiment includes an electric wire 12a that electrically connects an inverter 13 installed on the front side of the vehicle 10 and a battery 14 installed on the rear side of the vehicle 10 relative to the inverter 13. The inverter 13 is connected to a motor for driving the wheels (not illustrated), which serves as a motive power source for vehicle travel.

That is to say, the electric wire 12a is electrically connected to the battery 14 that is a power source for driving a motor serving as a motive power source for vehicle travel. The inverter 13 generates AC power from DC power of the battery 14, and supplies the generated AC power to the motor. The battery 14 is a battery capable of supplying a voltage of a hundred and several ten volts to several hundred volts, for example.

The vehicle 10 includes a vehicle body panel 15 that separates the inside of the vehicle cabin from the outside of the vehicle cabin from each other. The vehicle body panel 15 is a panel that partitions a space under the floor in the vehicle 10 from the engine room, for example. The vehicle body panel 15 is provided with an insertion hole 16 passing through the vehicle body panel 15. The wire harness 12 is inserted into the insertion hole 16. In addition, the grommet 20 is attached to a portion of the vehicle body panel 15 surrounding the insertion hole 16. The grommet 20 is for stopping water entering the insertion hole 16. Specifically, the grommet 20 is for stopping water entering between the wire harness 12 and the portion of the vehicle body panel 15 surrounding the insertion hole 16. The grommet 20 also serves to protect the wire harness 12 that is inserted into the insertion hole 16.

Configuration of Grommet 20

Figure 3:
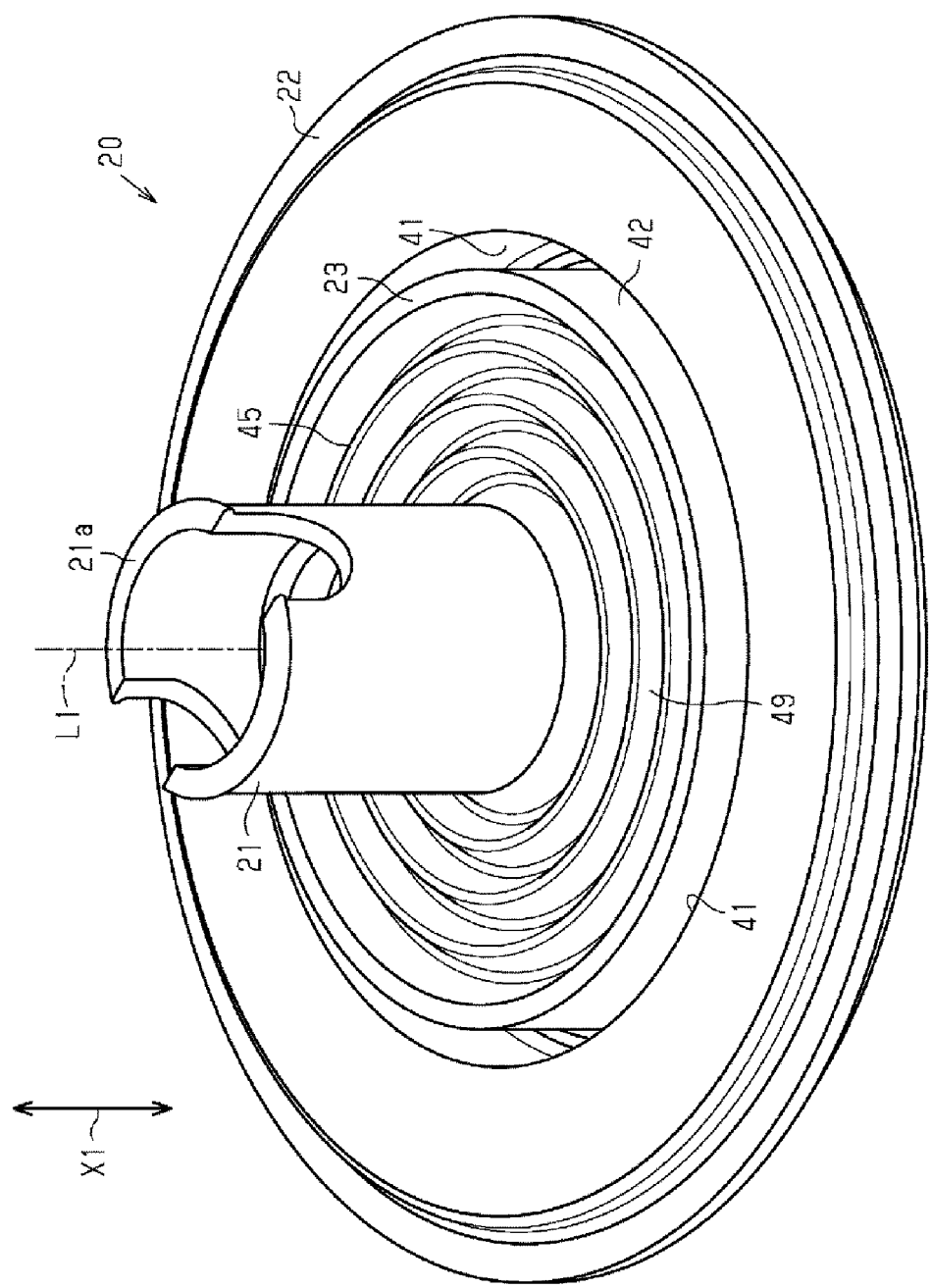
FIG. 3 is a perspective view of a grommet according to an embodiment.

As shown in FIGS. 2 and 3, the grommet 20 includes a tubular insertion portion 21 that covers the outer periphery of the wire harness 12, an opposing portion 22 that opposes the portion of the vehicle body panel 15 surrounding the insertion hole 16, and a coupling portion 23 that couples the insertion portion 21 and the opposing portion 22. The grommet 20 is made of a flexible material. An elastomer such as highly flexible EPDM (ethylene propylene diene rubber) can be used as the material of the grommet 20, for example. The insertion portion 21, the opposing portion 22, and the coupling portion 23 are integrally formed.

Configuration of Insertion Portion 21

The insertion portion 21 has a cylindrical shape. The external diameter of the insertion portion 21 is smaller than the internal diameter of the insertion hole 16. Here, one end in the axial direction of the insertion portion 21 is referred to as a "first end 21a", and the other end is referred to as a "second end 21b". In the drawings, the upper end of the insertion portion 21 is the first end 21a, and the lower end thereof is the second end 21b.

The insertion portion 21 and the wire harness 12 inserted into the insertion portion 21 are kept from moving relative to each other in the axial direction of the insertion portion 21, using a fixing member (not illustrated). The fixing member is an adhesive tape that is wound over the outer circumference surface of the insertion portion 21 and the outer peripheral surface of the wire harness 12, a cable tie that is mounted to the outer circumference surface of the insertion portion 21, or the like.

Configuration of Opposing Portion 22

The opposing portion 22 is formed in an annular shape surrounding the outer circumference of the insertion portion 21 when viewed from the axial direction of the insertion portion 21. Note that, hereinafter, a direction parallel to the central axis L1 of the opposing portion 22, in other words, the axial direction of the opposing portion 22 will be referred to as an "axial direction X1". In addition, a "radial direction" simply stated herein refers to the radial direction of the opposing portion 22, namely a direction orthogonal to the central axis L1. Also, a "circumferential direction" simply stated herein refers to the circumferential direction of the opposing portion 22, namely a circumferential direction with respect to the central axis L1.

In the present embodiment, the opposing portion 22 is formed in an annular shape. When viewed from the axial direction X1, the insertion portion 21 and the opposing portion 22 are concentric with each other. The external diameter of the opposing portion 22 is larger than the internal diameter of the insertion hole 16. In addition, in the present embodiment, the second end 21b of the insertion portion 21 is positioned within the range of the thickness of the opposing portion 22, in the axial direction X1.

Figure 4:
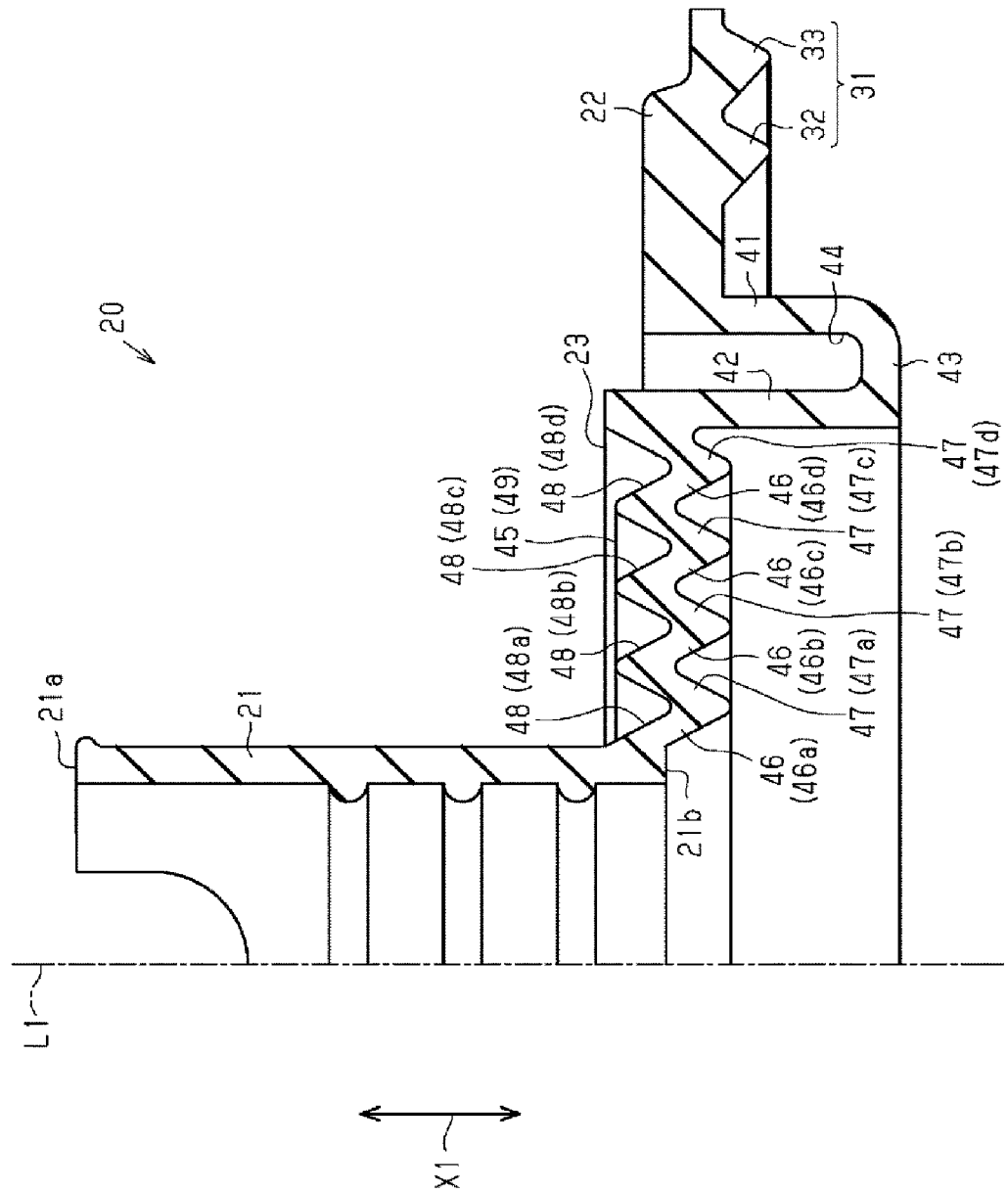
FIG. 4 is a cross-sectional view of a grommet according to an embodiment.

As shown in FIGS. 2 and 4, the opposing portion 22 includes a sealing portion 31, on one side surface in the axial direction X1 of the opposing portion 22. In the opposing portion 22, the one side surface is a side surface that opposes the vehicle body panel 15 in the axial direction X1 when the grommet 20 is mounted to the vehicle body panel 15. The sealing portion 31 is in intimate contact with the portion of the vehicle body panel 15 surrounding the insertion hole 16 when the grommet 20 is mounted to the vehicle body panel 15.

The sealing portion 31 includes a first lip portion 32 and a second lip portion 33. The first lip portion 32 and the second lip portion 33 protrude in the axial direction X1 from the one side surface in the axial direction X1 of the opposing portion 22. In addition, the first lip portion 32 and the second lip portion 33 are formed in protrusions extending along the circumferential direction in a continuous manner. The first lip portion 32 is formed in an annular shape that is just larger than the internal diameter of the insertion hole 16. The second lip portion 33 is formed in an annular shape that is just larger than the first lip portion 32. In a cross section of the grommet 20 cut along a plane that includes the central axis L1, the first lip portion 32 and the second lip portion 33 are adjacently arranged in the radial direction. Note that the cross-sectional views of the grommet 20 shown in FIGS. 2 and 4 to 7 are cross-sectional views of the grommet 20 cut along a plane that includes the central axis L1.

Configuration of Coupling Portion 23

As shown in FIGS. 2 and 3, the coupling portion 23 couples the insertion portion 21 and the opposing portion 22 so as to close a gap between the insertion portion 21 and the opposing portion 22. The coupling portion 23 is provided to extend from the end portion on the second end 21b side in the axial direction X1 of the insertion portion 21 to the end portion on the inner side in the radial direction of the opposing portion 22. The coupling portion 23 is formed in an annular shape extending in a continuous manner in the circumferential direction when viewed from the axial direction X1. In the present embodiment, the coupling portion 23 is provided so as to be concentric with the insertion portion 21 and the opposing portion 22 when viewed from the axial direction X1.

The coupling portion 23 includes a first tubular portion 41 provided on the end portion on the inner side in the radial direction of the opposing portion 22, integrally with the opposing portion 22. The first tubular portion 41 has a cylindrical shape extending in the axial direction X1. The first tubular portion 41 extends along the axial direction X1 from the end portion on the inner side in the radial direction of the opposing portion 22, and extends in the same direction as the protruding direction of the first lip portion 32 and the second lip portion 33. The external diameter of the first tubular portion 41 is just smaller than the internal diameter of the insertion hole 16. The internal diameter of the first tubular portion 41 is larger than the external diameter of the insertion portion 21. In addition, the first tubular portion 41 is formed coaxially with the insertion portion 21.

Moreover, the coupling portion 23 includes a second tubular portion 42 positioned on the inner side relative to the first tubular portion 41. The second tubular portion 42 is formed coaxially with the insertion portion 21 and the first tubular portion 41. The external diameter of the second tubular portion 42 is just smaller than the internal diameter of the first tubular portion 41. The internal diameter of the second tubular portion 42 is larger than the external diameter of the insertion portion 21. Moreover, the outer circumferential surface of the second tubular portion 42 opposes the inner circumferential surface of the first tubular portion 41 in the radial direction. A gap is provided between the outer circumferential surface of the second tubular portion 42 and the inner circumferential surface of the first tubular portion 41.

One end portion in the axial direction X1 of the first tubular portion 41 and one end portion in the axial direction X1 of the second tubular portion 42 are coupled using a coupling bottom portion 43. Specifically, the coupling bottom portion 43 couples the end portion of the first tubular portion 41 on the opposite side in the axial direction X1 to the end portion thereof linked to the opposing portion 22, and the end portion in the axial direction X1 of the second tubular portion 42 that opposes the above end portion of the first tubular portion 41 in the radial direction. The coupling bottom portion 43 is provided integrally with the first tubular portion 41 and the second tubular portion 42. An annular insertion groove 44 is formed by the first tubular portion 41, the second tubular portion 42, and the coupling bottom portion 43. The insertion groove 44 is open in a direction opposite to the direction in which the first lip portion 32 and the second lip portion 33 protrude from the opposing portion 22.

The coupling portion 23 includes an expansion/contraction portion 45 between the insertion portion 21 and the second tubular portion 42. The expansion/contraction portion 45 is provided to extend from the end portion on the second end 21b side in the axial direction X1 of the insertion portion 21 to the end portion on the opposite side in the axial direction X1 to the end portion of the second tubular portion 42 linked to the coupling bottom portion 43. Moreover, the expansion/contraction portion 45 is formed in an annular shape extending in a continuous manner along the circumferential direction. The expansion/contraction portion 45 surrounds the end portion on the second end 21b side in the axial direction X1 of the insertion portion 21, around the entire circumference thereof.

As shown in FIG. 4, the expansion/contraction portion 45 includes a plurality of first wall portions 46 inclined relative to the central axis L1, and a plurality of second wall portions 47 inclined relative to the central axis L1 by an angle different from that of the first wall portions 46. In the present embodiment, the expansion/contraction portion 45 includes four first wall portions 46 and four second wall portions 47. Each of the first wall portions 46 and the second wall portions 47 is formed in an annular shape. Moreover, in a cross section of the grommet 20 cut along a plane that includes the central axis L1, the first wall portions 46 and the second wall portions 47 are alternately arranged in the radial direction.

Here, the four first wall portions 46 are referred to as first wall portions 46a, 46b, 46c, and 46d in order from the innermost side in the radial direction. Also, the four second wall portions 47 are referred to as second wall portions 47a, 47b, 47c, and 47d in order from the innermost side in the radial direction. The four first wall portions 46 and the four second wall portions 47 are adjacently arranged from the radial inner side outward in the radial direction, in order of the first wall portion 46a, the second wall portion 47a, the first wall portion 46b, the second wall portion 47b, the first wall portion 46c, the second wall portion 47c, the first wall portion 46d, and the second wall portion 47d. Thus, the second wall portion 47a is formed in an annular shape that is just larger than the first wall portion 46a. Also, the first wall portion 46b is formed in an annular shape that is just larger than the second wall portion 47a. Similarly, the second wall portion 47b is formed in an annular shape that is just larger than the first wall portion 46b, the first wall portion 46c is formed in an annular shape that is just larger than the second wall portion 47b, the second wall portion 47c is formed in an annular shape that is just larger than the first wall portion 46c, the first wall portion 46d is formed in an annular shape that is just larger than the second wall portion 47c, and the second wall portion 47d is formed in an annular shape that is just larger than the first wall portion 46d. Note that the internal diameter of the first wall portion 46a is the same as the external diameter of the end portion on the second end 21b side in the axial direction X1 of the insertion portion 21. In addition, the external diameter of the second wall portion 47d is the same as the internal diameter of the second tubular portion 42.

The first wall portions 46a to 46d are each inclined relative to the central axis L1 so as to increase in diameter as the distance from the first end 21a increases along the axial direction X1. On the other hand, the second wall portions 47a to 47d are each inclined relative to the central axis L1 so as to decrease in diameter as the distance from the first end 21a increases along the axial direction X1. In this manner, the direction of inclination of the first wall portions 46 and the direction of inclination of the second wall portions 47 are opposite. In addition, regarding a first wall portion 46 and a second wall portion 47 that are adjacent in the radial direction, end portions on one side in the axial direction X1 or end portions on the other side in the axial direction X1 are linked to each other.

The one end portion in the axial direction X1 of the first wall portion 46a positioned on the innermost side in the radial direction among the first wall portions 46 and the second wall portions 47 is linked to the outer circumference surface of the end portion on the second end 21b side in the axial direction X1 of the insertion portion 21. In addition, the one end portion in the axial direction X1 of the second wall portion 47d positioned on the outermost side in the radial direction among the first wall portions 46 and the second wall portions 47, in other words, the end portion of the second wall portion 47d on the opposite side to the first wall portion 46d is linked to the inner circumferential surface of the second tubular portion 42.

A first wall portion 46 and a second wall portion 47 that are adjacent in the radial direction form an annular pleat portion 48 extending along the circumferential direction. Specifically, the first wall portion 46a positioned on the innermost side in the radial direction and the second wall portion 47a that is positioned outward in the radial direction of the first wall portion 46a and is adjacent to the first wall portion 46a in the radial direction form a pleat portion 48a. The first wall portion 46a and the second wall portion 47a form an annular groove that is open on one side in the axial direction X1, and form an annular protrusion that protrudes on the other side in the axial direction X1, and extends along the circumferential direction. In FIG. 4, the first wall portion 46a and the second wall portion 47a form a groove that is open upward, and form a protrusion that protrudes downward. Therefore, the pleat portion 48a is formed in a shape that has a groove extending in the same direction as the protrusion, on the back side of the protrusion. In the present embodiment, a cross section of the pleat portion 48a cut along a plane that includes the central axis L1, in other words a plane orthogonal to the circumferential direction is V-shaped. In addition, the pleat portion 48a extends continuously in a seamless manner along the circumferential direction, and is formed in an annular shape when viewed from the axial direction of the insertion portion 21.

Similarly, the first wall portion 46b and the second wall portion 47b that are adjacent in the radial direction form a pleat portion 48b that is similar to the pleat portion 48a. In addition, the first wall portion 46c and the second wall portion 47c that are adjacent in the radial direction form a pleat portions 48c that is similar to the pleat portion 48a. Furthermore, the first wall portion 46d and the second wall portion 47d that are adjacent in the radial direction form a pleat portion 48d that is similar to the pleat portion 48a. From the inner side in the radial direction, the pleat portion 48a, the pleat portion 48b, the pleat portion 48c, and the pleat portion 48d are arranged adjacently in the radial direction in the stated order. That is to say, in a cross section of the grommet 20 cut along a plane that includes the central axis L1, the pleat portions 48a to 48d are arranged adjacently in the radial direction. Moreover, in the present embodiment, the positions of the pleat portions 48a to 48d in the axial direction X1 are the same. In addition, in the present embodiment, the widths of the pleat portions 48a to 48d in the axial direction X1 are the same.

Moreover, end portions in the axial direction X1 of the second wall portion 47a and the first wall portion 46b that are adjacent in the radial direction are linked to each other, and thus the pleat portion 48a and the pleat portions 48b that are adjacent in the radial direction are provided in a continuous manner. Similarly, end portions in the axial direction X1 of the second wall portion 47b and the first wall portion 46c that are adjacent in the radial direction are linked to each other, and thus the pleat portions 48b and 48c that are adjacent in the radial direction are provided in a continuous manner. Furthermore, end portions in the axial direction X1 of the second wall portion 47c and the first wall portion 46d that are adjacent in the radial direction are linked to each other, and thus the pleat portions 48c and the pleat portions 48d that are adjacent in the radial direction are provided in a continuous manner. Moreover, the pleat portions 48a to 48d form a bellows portion 49 in which the plurality of pleat portions 48 are connected continuously in the radial direction. In the present embodiment, the expansion/contraction portion 45 is constituted by the bellows portion 49.

Configuration of Bracket 51

As shown in FIG. 2, the grommet 20 is attached to the vehicle body panel 15 using a bracket 51 that is fixed to the vehicle body panel 15.

The bracket 51 is made of a metal plate. The bracket 51 includes an annular sandwiching portion 52, an insertion portion 53 provided integrally with the sandwiching portion 52 on the inner peripheral edge of the sandwiching portion 52, and a fixing portion 54 provided integrally with the sandwiching portion 52, on the outer peripheral edge of the sandwiching portion 52.

The external diameter of the sandwiching portion 52 is larger than the internal diameter of the insertion hole 16. The insertion portion 53 is formed in a cylindrical shape extending from the inner peripheral edge of the sandwiching portion 52. The internal diameter of the insertion portion 53 is larger than the external diameter of the second tubular portion 42. In addition, the external diameter of the insertion portion 53 is smaller than the internal diameter of the first tubular portion 41. On the outer peripheral edge portion of the sandwiching portion 52, fixing portions 54 are provided at a plurality of positions distant from each other in the circumferential direction of the sandwiching portion 52. In the present embodiment, fixing portions 54 are respectively provided at two positions on the outer peripheral edge portion of the sandwiching portion 52. Moreover, the two fixing portions 54 are distant from each other in the circumferential direction of the sandwiching portion 52 at 180°. Fixing holes 55 extending through the fixing portions 54 are formed in the fixing portions 54, respectively.

Attachment of Grommet 20 to Vehicle Body Panel 15

The same number of bolts 56 as the number of fixing portions 54, namely two bolts 56 are fixed to portions of the vehicle body panel 15 near the insertion hole 16. The head portions of the bolts 56 are fixed to the vehicle body panel 15 through welding or the like. The two bolts 56 are distant from each other in the circumferential direction of the insertion hole 16 at 180°.

When the grommet 20 is attached to the vehicle body panel 15, first, the grommet 20 is disposed on the vehicle body panel 15. The grommet 20 is disposed such that the first tubular portion 41 is inserted into the insertion hole 16, and the opposing portion 22 opposes a portion of the vehicle body panel 15 surrounding the insertion hole 16 in the axial direction X1. At this time, the sealing portion 31 comes into contact with the portion of the vehicle body panel 15 surrounding the insertion hole 16. Next, the bracket 51 is disposed on the vehicle body panel 15. The bracket 51 is disposed on the vehicle body panel 15 such that the insertion portion 53 is inserted into the insertion groove 44 of the grommet 20, and the bolts 56 are respectively inserted into the fixing holes 55. Accordingly, the opposing portion 22 is disposed between the sandwiching portion 52 and the portion of the vehicle body panel 15 surrounding the insertion hole 16.

Thereafter, nuts 57 are respectively screwed onto the bolts 56, and the bracket 51 is thereby fixed to the vehicle body panel 15. Accordingly, the grommet 20 is attached to the vehicle body panel 15. When the nuts 57 are tightened, the opposing portion 22 is sandwiched between the sandwiching portion 52 and the portion of the vehicle body panel 15 surrounding the insertion hole 16. The nuts 57 are then tightened until the first lip portion 32 and the second lip portion 33 come into intimate contact with the portion of the vehicle body panel 15 surrounding the insertion hole 16, in a liquid-tight manner. Note that FIG. 2 shows a state where the nuts 57 are tightened until immediately before the first lip portion 32 and the second lip portion 33 are pressed against the vehicle body panel 15.

Operation of the present embodiment will be described.

Due to the first lip portion 32 and the second lip portion 33 in intimate contact with the portion of the vehicle body panel 15 surrounding the insertion hole 16, liquid such as water is kept from passing between the grommet 20 and the portion of the vehicle body panel 15 surrounding the insertion hole 16.

Figure 5:
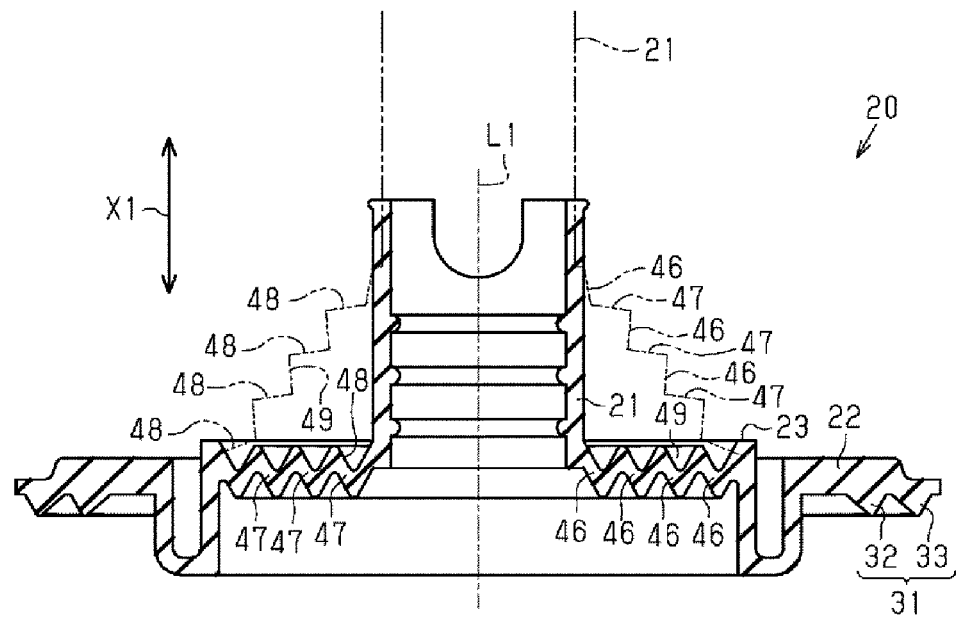
FIG. 5 is a cross-sectional view of a grommet according to an embodiment.

FIG. 5 illustrates the grommet 20 in a state where the wire harness 12 is displaced in the axial direction X1, in a virtual manner with a dashed double-dotted line. In FIG. 5, the insertion portion 21 illustrated with the dashed double-dotted line moves relative to the opposing portion 22 so as to separate from the opposing portion 22 in a direction from the second end 21b toward the first end 21a, in other words, upward in FIG. 5. In this case, as a result of the pleat portions 48 opening, in other words, the bellows portion 49 deforming such that each angle formed between a first wall portion 46 and a second wall portion 47 that are adjacent in the radial direction increases, stress caused by movement of the insertion portion 21 relative to the opposing portion 22 in the axial direction X1 can be absorbed by the bellows portion 49. Thus, deformation of the opposing portion 22 positioned on the outer periphery of the bellows portion 49 is suppressed. In addition, movement of the insertion portion 21 relative to the opposing portion 22 in the axial direction X1 is allowed using the bellows portion 49. Note that, also when the insertion portion 21 moves relative to the opposing portion 22 in a direction from the first end 21a toward the second end 21b, in other words, downward in FIG. 5, stress caused by such relative movement is similarly absorbed by the bellows portion 49.

Figure 6:
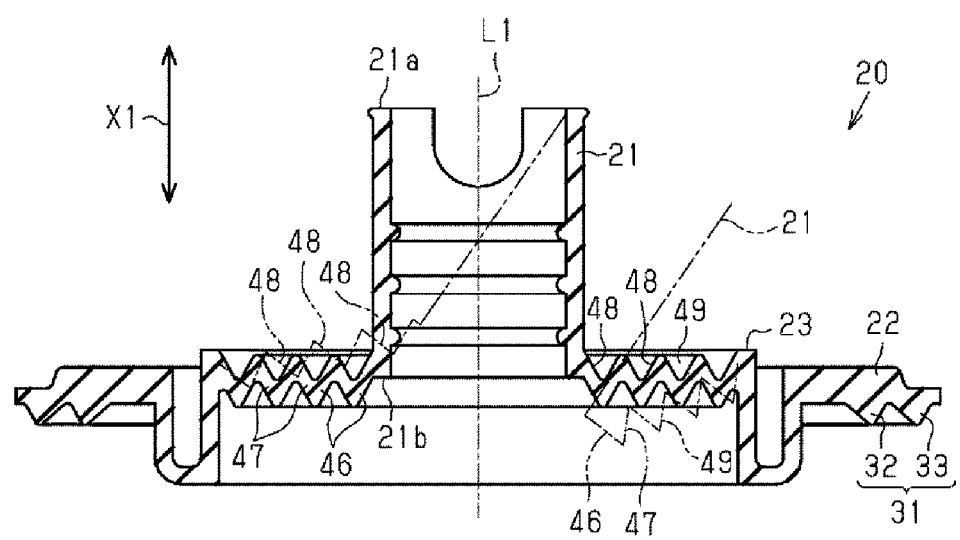
FIG. 6 is a cross-sectional view of a grommet according to an embodiment.

Also, FIG. 6 illustrates the grommet 20 in a state where the wire harness 12 is inclined relative to the axial direction X1, in other words, the insertion portion 21 is inclined relative to the axial direction X1, in a virtual manner with a dashed double-dotted line. In this case, as a result of the degree of opening of the pleat portions 48 changing, in other words, each angle formed between a first wall portion 46 and a second wall portion 47 that are adjacent in the radial direction changing, stress caused by inclination of the insertion portion 21 relative to the axial direction X1 can be absorbed by the bellows portion 49. Thus, deformation of the opposing portion 22 is suppressed. In addition, inclination of the insertion portion 21 relative to the axial direction X1 is allowed using the bellows portion 49. Note that FIG. 6 illustrates a state where the insertion portion 21 is inclined such that the first end 21a is displaced in the right direction relative to the second end 21b in FIG. 6, but, in whichever direction the insertion portion 21 is inclined relative to the axial direction X1, stress caused by the inclination is similarly allowed using the bellows portion 49.

Figure 7:
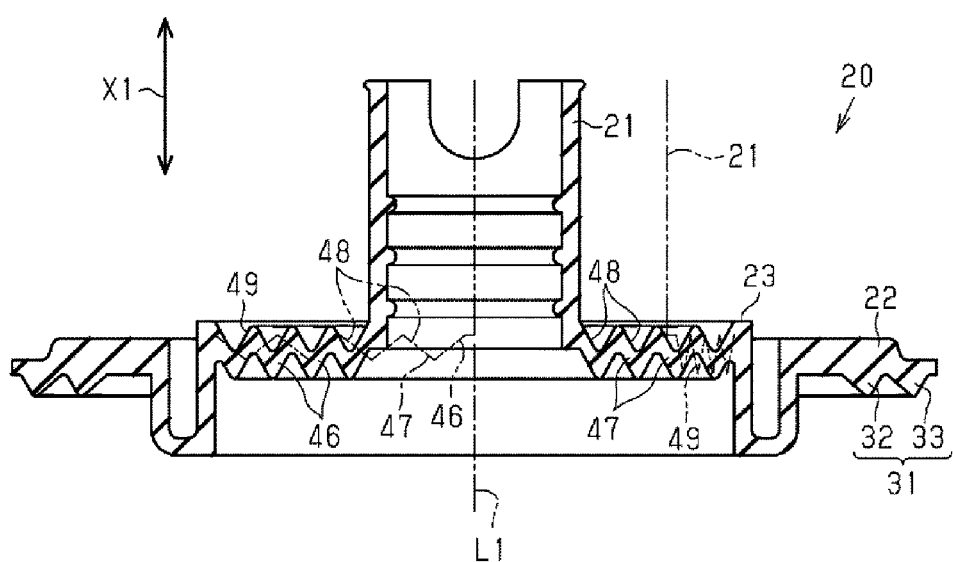
FIG. 7 is a cross-sectional view of a grommet according to an embodiment.

Also, FIG. 7 illustrates the grommet 20 in a state where the wire harness 12 is displaced relative to the opposing portion 22 in a direction orthogonal to the axial direction X1, namely, a direction orthogonal to the central axis L1, in other words, in a state where the insertion portion 21 is moved relative to the opposing portion 22 in a direction orthogonal to the axial direction X1, in a virtual manner with a dashed double-dotted line. In this case, as a result of the degree of opening of the pleat portions 48 changing, in other words, each angle formed between a first wall portion 46 and a second wall portion 47 that are adjacent in the radial direction changing, stress caused by movement of the insertion portion 21 relative to the opposing portion 22 in a direction orthogonal to the axial direction X1 can be absorbed by the bellows portion 49. Specifically, at a position where the distance between the insertion portion 21 and the opposing portion 22 in the radial direction is shorter, the bellows portion 49 deforms such that the pleat portions 48 close, in other words, each angle formed between a first wall portion 46 and a second wall portion 47 that are adjacent in the radial direction decreases. In addition, at a position where the distance between the insertion portion 21 and the opposing portion 22 in the radial direction is longer, the bellows portion 49 deforms such that the pleat portions 48 open, in other words, each angle formed between a first wall portion 46 and a second wall portion 47 that are adjacent in the radial direction increases. Thus, deformation of the opposing portion 22 is suppressed. In addition, movement of the insertion portion 21 relative to the opposing portion 22 in a direction orthogonal to the axial direction X1 is allowed using the bellows portion 49.

Effects of the present embodiment will be described.

(1) The grommet 20 includes the tubular insertion portion 21 that covers the outer periphery of the wire harness 12 that is inserted into the insertion hole 16 provided in the vehicle body panel 15. The grommet 20 also includes the annular opposing portion 22 that opposes a portion of the vehicle body panel 15 surrounding the insertion hole 16, and is sandwiched between the vehicle body panel 15 and the bracket 51 that is fixed to the vehicle body panel 15. Furthermore, the grommet 20 includes the coupling portion 23 that couples the insertion portion 21 and the opposing portion 22 so as to close a gap between the insertion portion 21 and the opposing portion 22. The opposing portion 22 includes the annular sealing portion 31 to be in intimate contact with the vehicle body panel 15. The coupling portion 23 includes the plurality of pleat portions 48 that extend along the circumferential direction of the opposing portion 22, and are arranged in the radial direction of the opposing portion 22, when viewed from the axial direction X1.

With this configuration, as a result of the plurality of pleat portions 48 deforming so as to open and close, stress caused by movement of the insertion portion 21 relative to the opposing portion 22 can be absorbed by the coupling portion 23 that includes the plurality of pleat portions 48. Specifically, even when the insertion portion 21 moves relative to the opposing portion 22 in the axial direction X1, or the insertion portion 21 moves relatively in a direction orthogonal to the axial direction X1, or the insertion portion 21 is inclined, stress caused by the relative movement of the insertion portion 21 can be absorbed by the coupling portion 23. Therefore, it is possible to suppress deformation of the opposing portion 22 caused by movement of the insertion portion 21 relative to the opposing portion 22, and thus it is possible to suppress deformation of the sealing portion 31. As a result, it is possible to suppress a decrease in water stopping performance of the grommet 20.

(2) The pleat portions 48 are formed in an annular shape surrounding the outer circumference of the insertion portion 21 when viewed from the axial direction of the insertion portion 21.

With this configuration, in whichever direction the insertion portion 21 moves around the insertion portion 21 relative to the opposing portion 22, stress caused by movement of the insertion portion 21 relative to the opposing portion 22 can be absorbed by the coupling portion 23 that includes the pleat portions 48. Therefore, in whichever direction the insertion portion 21 moves around the insertion portion 21 relative to the opposing portion 22, it is possible to suppress deformation of the opposing portion 22, and thus, it is possible to suppress deformation of the sealing portion 31. As a result, irrespective of the direction of movement of the insertion portion 21 relative to the opposing portion 22, it is possible to suppress a decrease in water stopping performance of the grommet 20. In addition, larger movement of the insertion portion 21 relative to the opposing portion 22 can be allowed using the coupling portion 23, and thus it is possible to further suppress a decrease in water stopping performance of the grommet 20.

(3) The coupling portion 23 includes the bellows portion 49 in which the plurality of pleat portions 48 are connected continuously in the radial direction. In the present embodiment, the four pleat portions 48 that are arranged adjacently in the radial direction constitute the bellows portion 49. Thus, in addition to the plurality of pleat portions 48 deforming so as to open and close, each portion between pleat portions 48 that are adjacent in the radial direction can deform so as to open and close. Therefore, stress caused by movement of the insertion portion 21 relative to the opposing portion 22 is more easily absorbed by the coupling portion 23 that includes the bellows portion 49. Thus, it is possible to further suppress deformation of the opposing portion 22 caused by movement of the insertion portion 21 relative to the opposing portion 22, and thus it is possible to further suppress deformation of the sealing portion 31. As a result, it is possible to further suppress a decrease in water stopping performance of the grommet 20. In addition, even larger movement of the insertion portion 21 relative to the opposing portion 22 can be allowed using the coupling portion 23, and thus it is possible to further suppress a decrease in water stopping performance.

Moreover, the plurality of pleat portions 48 that constitute the bellows portion 49 are arranged adjacently in the radial direction. That is to say, in a cross section of the grommet 20 cut along a plane that includes the central axis L1, the plurality of pleat portions 48 are arranged adjacently in the radial direction so as to overlap each other in the radial direction. Thus, compared with a case where a plurality of pleat portions are arranged adjacently so as to be displaced in the axial direction X1, it is possible to suppress the length in the axial direction X1 of the bellows portion 49 according to the present embodiment. Therefore, it is possible to suppress an increase in the size of the grommet 20 in the axial direction X1 due to having the plurality of pleat portions 48.

(4) The bellows portion 49 is directly coupled to the insertion portion 21. Thus, it is possible to suppress deformation of portions of the grommet 20 other than the bellows portion 49 when the insertion portion 21 moves relative to the opposing portion 22.

(5) The wire harness 12 includes the electric wire 12a that is electrically connected to the battery 14 that is a power source for driving a motor serving as a motive power source for vehicle travel. In addition, the grommet 20 includes the insertion portion 21 into which the wire harness 12 is inserted.

With this configuration, the electric wire 12a has a cross-section area that is large enough to supply a current from the battery 14 to the motor, and thus the cross-section area of the electric wire 12a tends to be large. Thus, the wire harness 12 that includes the electric wire 12a is not easily bent. If such a wire harness 12 is displaced relative to the vehicle body due to an attachment error or the like, it is difficult for such displacement to be absorbed on the wire harness 12 side through deformation of the wire harness 12. Thus, as a result of the insertion portion 21 into which the wire harness 12 is inserted being moved relative to the opposing portion 22, such displacement is absorbed. In this manner, even if the insertion portion 21 is moved relative to the opposing portion 22 due to displacement of the wire harness 12, the plurality of pleat portions 48 deform so as to open and close, and thereby stress caused by movement of the insertion portion 21 relative to the opposing portion 22 can be absorbed by the coupling portion 23 that includes the plurality of pleat portions 48. Therefore, even when the wire harness 12 that includes the electric wire 12a that is connected to the battery 14 is inserted into the insertion portion 21, it is possible to suppress deformation of the opposing portion 22 caused by movement of the insertion portion 21 relative to the opposing portion 22, and thus it is possible to suppress deformation of the sealing portion 31. As a result, even if the wire harness 12 that includes the electric wire 12a that is connected to the battery 14 is inserted into the insertion portion 21, it is possible to suppress a decrease in water stopping performance of the grommet 20.

(6) The coupling portion 23 provided between the insertion portion 21 and the opposing portion 22 does not have a layered structure in the axial direction X1, and is constituted by one piece. Therefore, compared with a case where the coupling portion is constituted by a section that includes a plurality of layers overlapping in the axial direction X1, an increase in the size of the grommet 20 in the axial direction X1 tends to be suppressed, and the grommet 20 can be easily manufactured. In addition, the coupling portion 23 that includes the bellows portion 49 is formed continuously in the circumferential direction in a seamless manner so as to close a gap between the insertion portion 21 and the opposing portion 22. Therefore, the coupling portion 23 can absorb stress caused by movement of the insertion portion 21 relative to the opposing portion 22 while ensuring the water stopping performance of the coupling portion 23.

The present embodiment can be changed as follows and carried out. Any combination of the present embodiment and the following modified examples can be made as long as there is no technical contradiction.

In the above embodiment, the inverter 13 and the battery 14 are used as the electric devices 11 that are connected by the wire harness 12, for example. However, the electric devices 11 that are connected by the wire harness 12 are not limited thereto, and any electric devices 11 that are mounted in the vehicle 10 may be used. Note that the electric devices 11 include a battery capable of supplying a voltage lower than that of the battery 14 (for example, a voltage of about 12 volts), as well as electric devices, control apparatuses, and the like that are supplied with a voltage from the battery. In this manner, the grommet 20 according to the present disclosure may be mounted to not only a high-voltage harness but also a low-voltage harness.

The bellows portion 49 does not necessarily need to be directly coupled to the insertion portion 21. An annular portion extending from the outer circumferential surface of the insertion portion 21 to the outer peripheral side may be provided between the inner peripheral edge of the bellows portion 49 and the insertion portion 21, for example. The annular portion is a portion of the coupling portion 23, and is provided perpendicularly to the axial direction X1. Moreover, the inner peripheral edge of the bellows portion 49 is coupled to the outer peripheral edge of the annular portion.

The number of pleat portions 48 constituting the bellows portion 49 is not limited to four, and any number of pleat portions 48 may be included as long as there are a plurality of pleat portions 48.

In the above embodiment, the plurality of pleat portions 48 are connected continuously in the radial direction, thereby constituting the bellows portion 49. However, the plurality of pleat portions 48 do not necessarily constitute the bellows portion 49. Pleat portions 48 that are adjacent in the radial direction may be coupled to each other by a portion of the coupling portion 23 that is not formed in a pleat shape, for example.

In the above embodiment, the widths of the plurality of pleat portions 48 in the axial direction X1 are the same. However, the widths of the plurality of pleat portions 48 in the axial direction X1 may be different.

In the above embodiment, the positions of the plurality of pleat portions 48 in the axial direction X1 are the same. However, as long as the plurality of pleat portions 48 are arranged adjacently in the radial direction when viewed from the axial direction X1, the positions in the axial direction X1 may be different. That is to say, the plurality of pleat portions 48 do not need to be arranged adjacently so as to overlap in the radial direction, in a cross section of the grommet 20 cut along a plane that includes the central axis L1.

In the above embodiment, the coupling portion 23 includes four pleat portions 48. However, the number of pleat portions 48 of the coupling portion 23 is not limited to four, and two or more pleat portions 48 is sufficient.

In the above embodiment, the pleat portions 48 are formed in an annular shape surrounding the outer circumference of the insertion portion 21 when viewed from the axial direction of the insertion portion 21. However, at least one of the plurality of pleat portions 48 may be formed in an arc extending along the circumferential direction of the insertion portion 21, when viewed from the axial direction of the insertion portion 21.

The shape of the opposing portion 22 when viewed from the axial direction X1 is not limited to a circular shape, and may be any annular shape. The opposing portion 22 may be annular with the outer shape thereof being elliptical, rounded rectangular (in other words, a race track shape), polygonal, or the like when viewed from the axial direction X1, for example.

The shape of the insertion portion 21 is not limited to a cylindrical shape, and may be any tubular shape. The shape of the insertion portion 21 may be a tubular shape that is elliptical, rounded rectangular, polygonal, or the like when viewed from the axial direction of the insertion portion 21, for example.

In the above embodiment, the grommet 20 includes only one insertion portion 21. However, the grommet 20 may include a plurality of insertion portions 21.

The present disclosure encompasses the following aspects. Reference signs of several constituent elements of exemplary embodiments are added, for assistance of understanding, not for limitation. Some of the items described in the following aspects may be omitted, and some of the items described in the aspects may be selected or extracted and combined.

[Supplementary Note 1] Some aspects according to the present disclosure are directed to a grommet (20) including: a tubular sheath (the insertion portion 21), through which a wire harness (12) is to be passed, along with a through hole (the insertion hole 16) that is open in a vehicle body panel (15), an annular portion (the opposing portion 22) extending along an opening edge of the through hole (18), and including a sealing portion (31) that is sandwiched between the vehicle body panel (15) and a bracket (51) that is fixed to the vehicle body panel (15), and an annular bellows portion (49) extending between the sheath (21) and the annular portion (22).

[Supplementary Note 2] In some implementation examples, the bellows portion (49) may include a plurality of pleats (the pleat portions 48a to 48d) that are arranged concentrically with the sheath (21).

[Supplementary Note 3] The plurality of pleats (the pleat portion 48a to 48d) may have the same cross-sectional shape.

[Supplementary Note 4] In some implementation examples, bend portions (41, 42, 43) that protrude from an inner peripheral edge of the annular portion (22) into the through hole (16), and are disposed between the annular portion (22) and the bellows portion (49) may be further provided.

[Supplementary Note 5] In some implementation example, the sheath (21) may protrude in an opposite direction to the bend portions (41, 42, 43).

[Supplementary Note 6] In some implementation examples, the bellows portion (49) may cover the through hole (16).

[Supplementary Note 7] In some implementation examples, the sealing portion (31) may include a double lip (32, 33) that comes into intimate contact with one surface of the vehicle body panel (15).

[Supplementary Note 8] In some implementation examples, the sheath (21), the bellows portion (49), and the annular portion (22) may be arranged concentrically with one another.

[Supplementary Note 9] In some implementation examples, the grommet (20) may be an elastic body.

[Supplementary Note 10] In some implementation examples, the sheath (21) and the bellows portion (49) may be elastically deformable on an inner periphery side of the bend portions (41, 42, 43).

LIST OF REFERENCE NUMERALS

10 Vehicle
11 Electric device
12 Wire harness
12a Electric wire
13 Inverter (a motor that is connected on the further side thereof corresponds to an example of a motive power source)
14 Battery (power source)
15 Vehicle body panel
16 Insertion hole
20 Grommet
21 Insertion portion
21a First end
21b Second end
22 Opposing portion
23 Coupling portion
31 Sealing portion
32 First lip portion
33 Second lip portion
41 First tubular portion
42 Second tubular portion
43 Coupling bottom portion
44 Insertion groove
45 Expansion/contraction portion
46 First wall portion
46a to 46d First wall portion
47 Second wall portion
47a to 47d Second wall portion
48 Pleat portion
48a to 48d Pleat portion
49 Bellows portion
51 Bracket
52 Sandwiching portion
53 Insertion portion
54 Fixing portion
55 Fixing hole
56 Bolt
57 Nut
L1 Central axis
X1 Axial direction

What is claimed is:

1. A grommet comprising:
an insertion portion having a tubular shape and being configured to cover an outer periphery of a wire harness inserted into an insertion hole provided in a vehicle body panel;
an opposing portion having a tubular shape and being configured to oppose a portion of the vehicle body panel surrounding the insertion hole, and to be sandwiched between the vehicle body panel and a bracket fixed to the vehicle body panel; and
a coupling portion that couples the insertion portion and the opposing portion so as to close a gap between the insertion portion and the opposing portion,
wherein
the opposing portion includes an annular sealing portion to be in intimate contact with the vehicle body panel,
the coupling portion includes
a plurality of pleat portions that extend along a circumferential direction of the opposing portion, and are adjacently arranged in a radial direction of the opposing portion,
a first tubular portion having a tubular shape that extends axially from a radially inward side of the opposing portion, and
a second tubular portion having a tubular shape that extends axially from a radially outward side of the plurality of pleat portions, and
the coupling portion is configured to receive an insertion portion of the bracket between opposing surfaces of the first and second tubular portions.

2. The grommet according to claim 1, wherein at least one of the plurality of pleat portions is formed in an annular shape that surrounds an outer periphery of the insertion portion.

3. The grommet according to claim 1, wherein the coupling portion includes a bellows portion in which the plurality of pleat portions are connected continuously in a radial direction of the opposing portion.

4. The grommet according to claim 3, wherein the bellows portion is directly coupled to the insertion portion.

5. The grommet according to claim 1, wherein the wire harness is to be inserted into the insertion portion of the grommet and includes an electric wire that is electrically connected to a power source for driving a motive power source for vehicle travel.

6. The grommet according to claim 1, wherein the coupling portion further includes
a coupling bottom portion for coupling an axial end of the first tubular portion and an axial end of the second tubular portion, the coupling bottom portion configured to seat an axial end of the insertion portion of the bracket when the insertion portion of the bracket is received by the coupling portion, and
an annular insertion groove formed by the first tubular portion, the second tubular portion, and the coupling bottom portion.

7. The grommet according to claim 6,
wherein the bracket includes an annular sandwiching portion having an annular shape that is positioned in opposition to the portion of the vehicle body panel surrounding the insertion hole, and
wherein the insertion portion is provided integrally with the sandwiching portion on an inner peripheral edge of the sandwiching portion and is formed in a tubular shape extending axially from the inner peripheral edge of the sandwiching portion to be received by the annular insertion groove.

8. The grommet according to claim 7, wherein the bracket further includes a fixing portion provided integrally with the sandwiching portion on an outer peripheral edge of the sandwiching portion and configured to fix the bracket to the vehicle body panel on a radially outward side of the annular sealing portion.

* * * * *